United States Patent
Horiguchi et al.

(10) Patent No.: US 9,190,027 B2
(45) Date of Patent: Nov. 17, 2015

(54) RECORDING MEDIUM, INFORMATION PROCESSING APPARATUS, AND PRESENTATION METHOD

(71) Applicant: FUJITSU LIMITED, Kawasaki-shi (JP)

(72) Inventors: Nao Horiguchi, Yokohama (JP); Ena Watanabe, Kawasaki (JP); Masashi Tanimura, Ann Arbor, MI (US); Kota Ariyama, Kawasaki (JP); Takeshi Ueno, Sapporo (JP); Katsuaki Akama, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 127 days.

(21) Appl. No.: 13/948,881

(22) Filed: Jul. 23, 2013

(65) Prior Publication Data

US 2014/0092098 A1 Apr. 3, 2014

(30) Foreign Application Priority Data

Oct. 3, 2012 (JP) .................. 2012-221550

(51) Int. Cl.
*G09G 5/24* (2006.01)
*G06F 17/27* (2006.01)
*G06F 17/22* (2006.01)
*G06F 3/023* (2006.01)

(52) U.S. Cl.
CPC .............. *G09G 5/24* (2013.01); *G06F 17/2217* (2013.01); *G06F 17/2223* (2013.01); *G06F 17/273* (2013.01); *G06F 17/275* (2013.01); *G06F 17/276* (2013.01); *G06F 3/0237* (2013.01)

(58) Field of Classification Search
None
See application file for complete search history.

(56) References Cited

U.S. PATENT DOCUMENTS

2006/0217958 A1* 9/2006 Tagawa et al. ............... 704/2
2010/0057439 A1* 3/2010 Ideuchi et al. ............... 704/7
2011/0205160 A1* 8/2011 Song et al. .................. 345/168

FOREIGN PATENT DOCUMENTS

JP 2005-44075 2/2005
JP 2006-331354 12/2006

* cited by examiner

*Primary Examiner* — Jwalant Amin
(74) *Attorney, Agent, or Firm* — Fujitsu Patent Center

(57) ABSTRACT

When a French character is selected while an English character string candidate is presented, a mobile terminal presents English and French character string candidates by using an English/French mixed candidate dictionary. Furthermore, when a French character is selected while English and French character string candidates are presented by using the English/French mixed candidate dictionary, the mobile terminal presents a French character string candidate by using a French candidate dictionary. Moreover, when a character other than French is selected while a French character string candidate is presented by using the French candidate dictionary, the mobile terminal presents an English character string candidate by using an English candidate dictionary.

3 Claims, 12 Drawing Sheets

RECORDING MEDIUM, INFORMATION PROCESSING APPARATUS, AND PRESENTATION METHOD

CROSS-REFERENCE TO RELATED APPLICATION

This application is based upon and claims the benefit of priority of the prior Japanese Patent Application No. 2012-221550, filed on Oct. 3, 2012, the entire contents of which are incorporated herein by reference.

FIELD

The embodiments discussed herein are related to a recording medium, an information processing apparatus, and a presentation method.

BACKGROUND

In an information processing apparatus capable of inputting characters in multiple languages, such as Japanese or English, a character input mode is provided for each language. When a user is to input characters in a desired language, the user performs a switch operation to switch and set the input mode to that of the desired language. Therefore, when a user is to input a text in a desired language, the user changes and sets the input mode to that of the desired language.

Japanese Laid-open Patent Publication No. 2006-331354
Japanese Laid-open Patent Publication No. 2005-44075

With the above information processing apparatus, however, if, for example, the mode is switched to English and, while an English text is being created, a few French words, such as a French character string "Café du Crie", are to be input on a temporary basis, the setting is purposefully switched from the English mode to the French mode. Therefore, in the above information processing apparatus, if characters in a different language are to be input on a temporary basis, i.e., if a character format is to be changed, an operation to switch the input mode needs to be performed, which increases the user workload.

SUMMARY

According to an aspect of embodiments, an information processing apparatus includes a processor. The processor executes a process. The process includes, while a character string candidate in a first character format is presented and when a character in a second character format is selected, presenting character string candidates in the first character format and the second character format, the second character format being different from the first character format. The process includes, while character string candidates in the first character format and the second character format are presented and when a character in the second character format is selected, presenting a character string candidate in the second character format. The process includes, while a character string candidate in the second character format is presented and when a character in a character format other than the second character format is selected, presenting a character string candidate in the first character format.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments of the present invention will be explained with reference to accompanying drawings.

The disclosed technology is not limited to the present embodiment. Furthermore, the following embodiments may be combined as appropriate to the extent that there is no contradiction.

[a] First Embodiment

Figure 1:
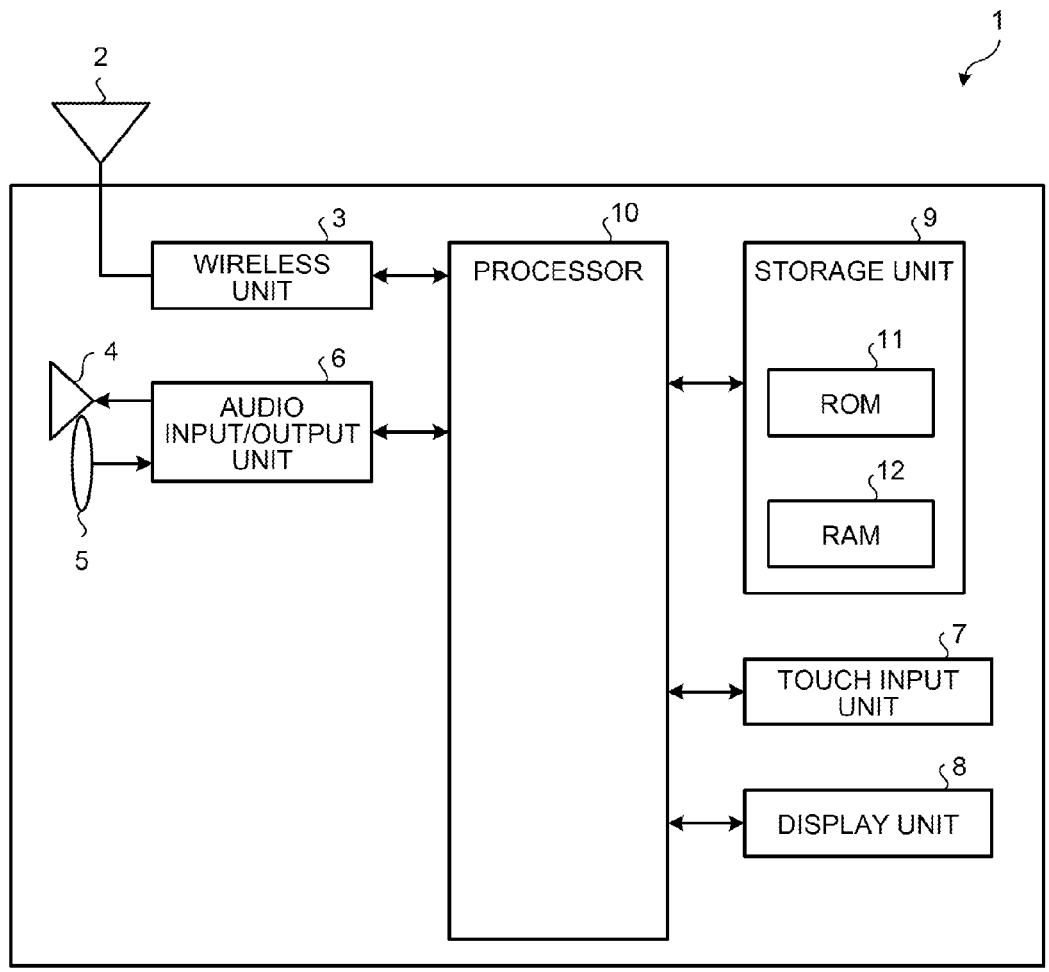
FIG. 1 is an explanatory diagram that illustrates an example of a mobile terminal according to a first embodiment.

FIG. 1 is an explanatory diagram that illustrates an example of a mobile terminal 1 according to a first embodiment. The mobile terminal 1 illustrated in FIG. 1 is a tablet terminal, or the like, that has a character input function on an operation screen. The mobile terminal 1 may be, for example, a mobile phone, smartphone, or the like. The mobile terminal 1 includes a wireless antenna 2, a wireless unit 3, a speaker 4, a microphone 5, an audio input/output unit 6, a touch input unit 7, a display unit 8, a storage unit 9, and a processor 10. The wireless unit 3 is a wireless interface that performs wireless communication by using the wireless antenna 2. The audio input/output unit 6 is an interface that connects to the speaker 4 and the microphone 5 and inputs/outputs audio signals on, for example, voices of a telephone call, or the like. The display unit 8 is, for example, a liquid crystal display (LCD) that displays various types of information. The touch input unit 7 detects a touch operation on an operation screen that is screen-displayed on the display unit 8. The processor 10 performs overall control of the mobile terminal 1.

The storage unit 9 stores therein various types of information. The storage unit 9 includes a read only memory (ROM) 11 and a random access memory (RAM) 12. The ROM 11 is a nonvolatile memory that stores therein various programs, or the like. The RAM 12 is a volatile memory that stores therein various types of information, for example, dictionaries of English character strings (words) or French character strings (words).

The processor 10 reads various programs that are stored in the ROM 11 and has the function of performing various processes according to the read program. The processor 10 detects a touch input on an operation screen via the touch input unit 7. The processor 10 makes it possible to set the English mode, in which English characters are input and also a character string candidate, which is an English conversion candidate, is presented, and to set the French mode, in which French characters are input and also a French character string candidate is presented. For the convenience of explanation, the English mode is set as the typically used mode in the present embodiment.

If, for example, the English mode is set, the processor 10 screen-displays an English-mode operation screen on the display unit 8. The processor 10 receives a key input of English characters and receives a selection of character strings in response to a touch operation on the English-mode operation screen. The processor 10 screen-displays English characters and character strings on the display unit 8 in response to the touch operation.

If, for example, the French mode is set, the processor 10 screen-displays a French-mode operation screen on the display unit 8. The processor 10 receives a key input of French characters and receives a selection of character strings in response to a touch operation on the French-mode operation screen. The processor 10 screen-displays French characters and character strings on the display unit 8 in response to the touch operation.

Figure 2:
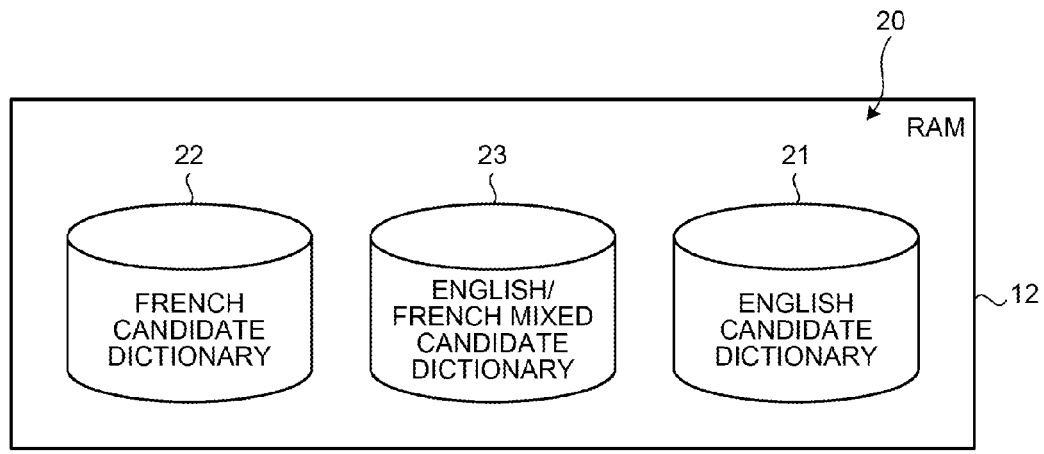
FIG. 2 is an explanatory diagram that illustrates an example of a dictionary table of the mobile terminal.

FIG. 2 is an explanatory diagram that illustrates an example of a dictionary table of the mobile terminal 1. A dictionary table 20 illustrated in FIG. 2 is stored in, for example, the RAM 12. The dictionary table 20 includes an English candidate dictionary 21, a French candidate dictionary 22, and an English/French mixed candidate dictionary 23. The English candidate dictionary 21 is a table that stores therein English characters and character strings that are used in the English mode. The French candidate dictionary 22 is a table that stores therein French characters and character strings that are used in the French mode. The English/French mixed candidate dictionary 23 is a table that stores therein English characters and character strings that are used in the English mode and French characters and character strings that are used in the French mode. For the convenience of explanation, the English/French mixed candidate dictionary 23 is provided separately from the English candidate dictionary 21 and the French candidate dictionary 22; however, instead of the English/French mixed candidate dictionary 23 being separately provided, the English candidate dictionary 21 and the French candidate dictionary 22 may be used as the English/French mixed candidate dictionary 23.

Figure 3:
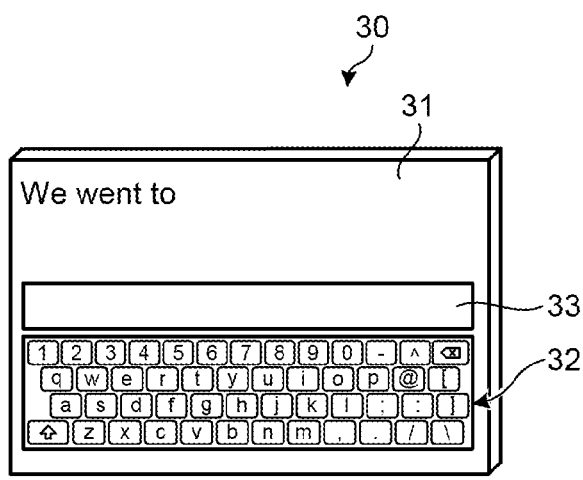
FIG. 3 is an explanatory diagram that illustrates an example of an operation screen of the mobile terminal.

FIG. 3 is an explanatory diagram that illustrates an example of an operation screen 30 of the mobile terminal 1. The operation screen 30 illustrated in FIG. 3 is an exemplary operation screen in the English mode. The operation screen 30 includes a character display area 31, an operation display area 32, and a conversion-candidate display area 33. The character display area 31 is an area where input characters and character strings are screen-displayed. The operation display area 32 is an area where a group of QWERTY arrangement operation keys is screen-displayed. The conversion-candidate display area 33 is an area where a list of character string candidates is displayed.

Figure 4:
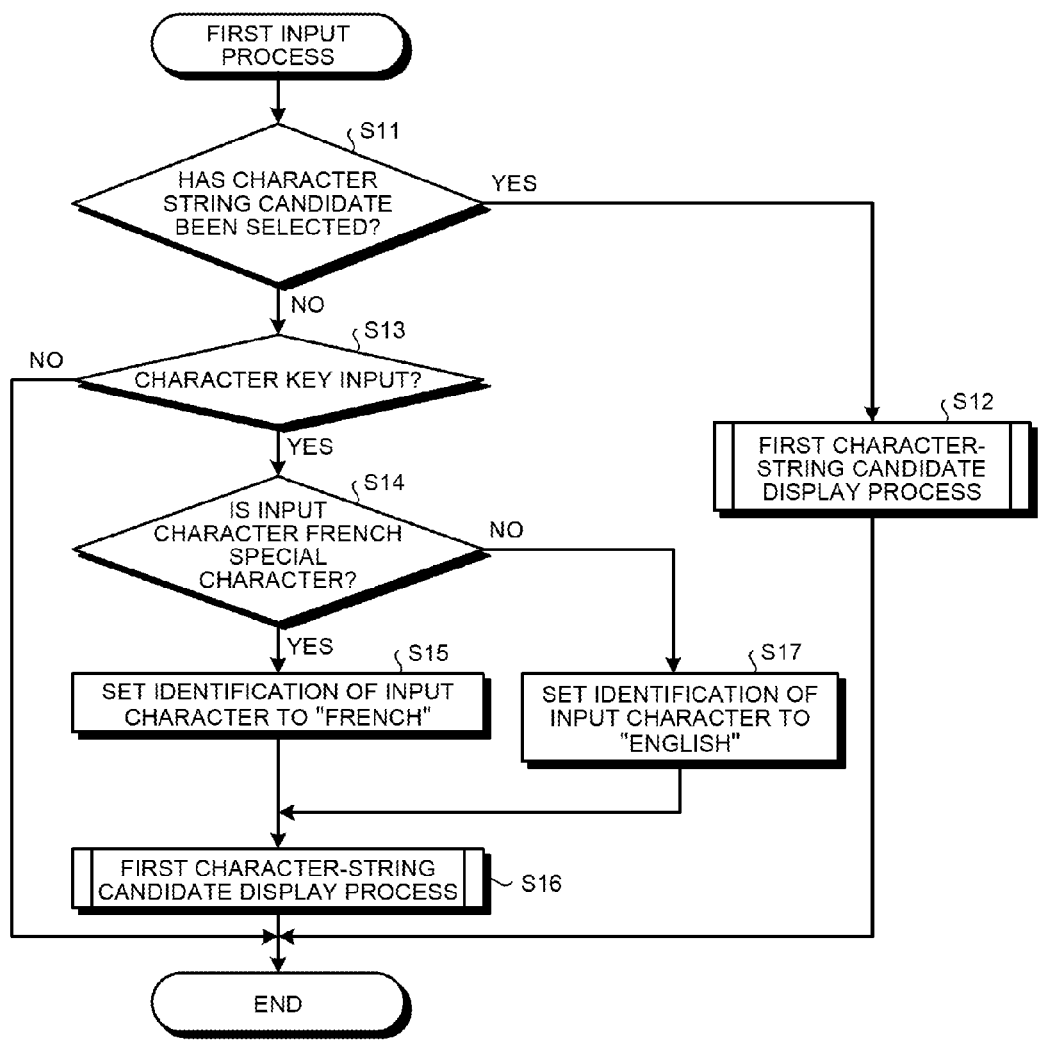
FIG. 4 is a flowchart that illustrates an exemplary operation of a processor in relation to a first input process of the mobile terminal.

Next, an explanation is given of an operation of the mobile terminal 1 according to the first embodiment. FIG. 4 is a flowchart that illustrates an exemplary operation of the processor 10 in relation to a first input process of the mobile terminal 1. The first input process illustrated in FIG. 4 is a process to select a character string candidate on the conversion-candidate display area 33 or to detect a character key input on the operation display area 32.

The processor 10 determines whether an operation to select a character string candidate on the conversion-candidate display area 33 has been detected (Step S11). The processor 10 detects an operation to select a character string candidate on the conversion-candidate display area 33 via the touch input unit 7.

If an operation to select a character string candidate has been detected (Yes at Step S11), the processor 10 performs a first character-string candidate display process (Step S12), which will be described later, and terminates the operation illustrated in FIG. 4. If an operation to select a character string candidate has not been detected (No at Step S11), the processor 10 determines whether a character key input is on the operation display area 32 (Step S13). The processor 10 detects a character key input on the operation display area 32 via the touch input unit 7.

In the case of a key input (Yes at Step S13), the processor 10 determines whether the input character is a French special character (Step S14). French special characters are, for example, "é", which is a character peculiar to French. If the input character is a French special character (Yes at Step S14), the processor 10 sets the identification of the input character to "French" (Step S15), performs the first character-string candidate display process (Step S16), and then terminates the operation illustrated in FIG. 4.

If an input character is not a French special character (No at Step S14), the processor 10 sets the identification of the input character to "English" (Step S17) and then proceeds to Step S16 so as to perform the first character-string candidate display process. If not a character key input (No at Step S13), the processor 10 terminates the operation illustrated in FIG. 4.

In the first input process illustrated in FIG. 4, the processor 10 is capable of detecting an operation to select a character string candidate on the conversion-candidate display area 33 via the touch input unit 7. The processor 10 detects a character key input on the operation display area 32 and, if the input character is a French special character, the processor 10 can set the identification of the input character to "French". If the input character is not a French special character, the processor 10 can set the identification of the input character to "English". Accordingly, it is possible to automatically identify input characters.

Figure 5:
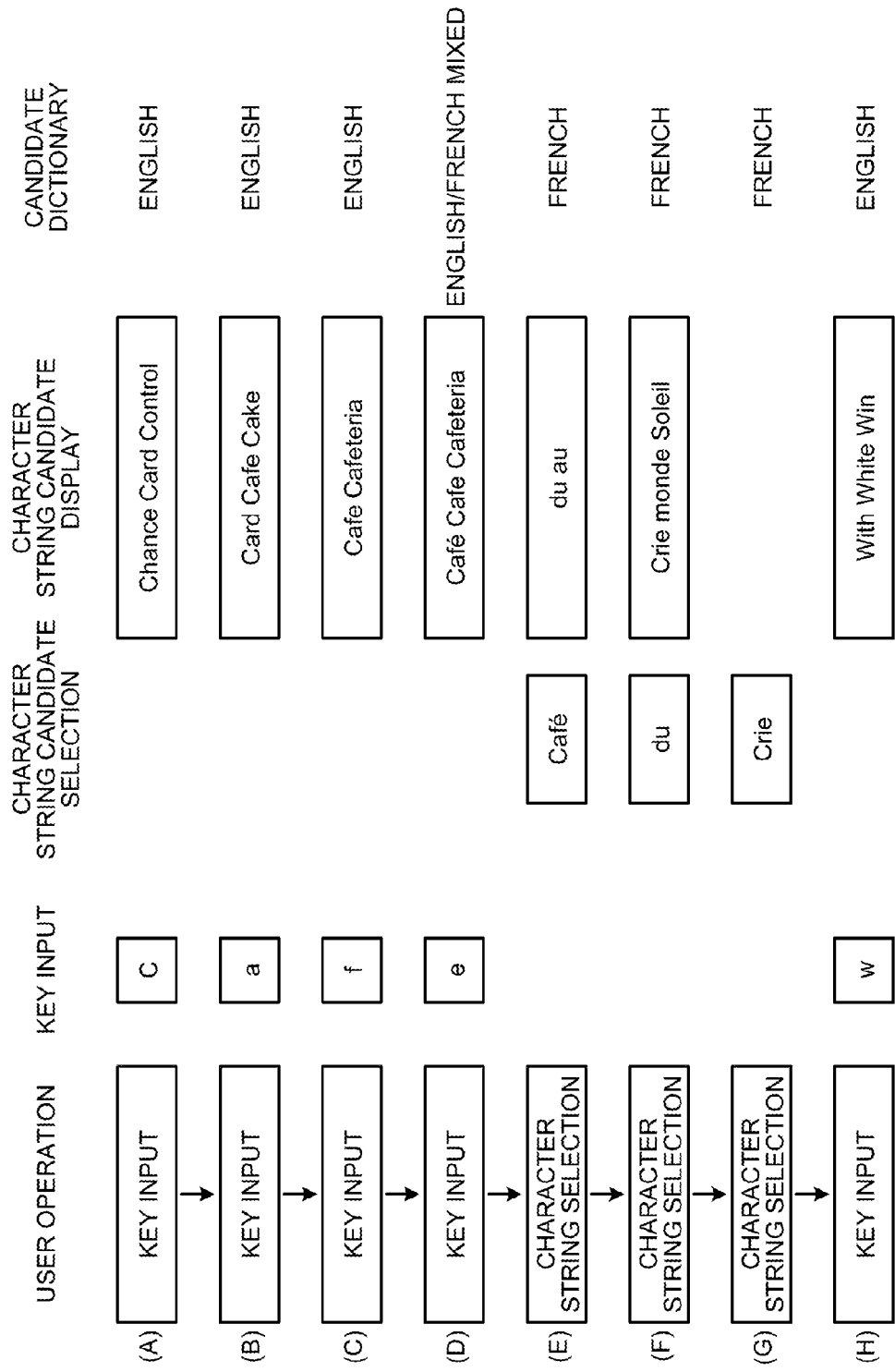
FIG. 5 is an explanatory diagram that illustrates operation types and exemplary character string candidates in relation to the mobile terminal.
Figure 6:
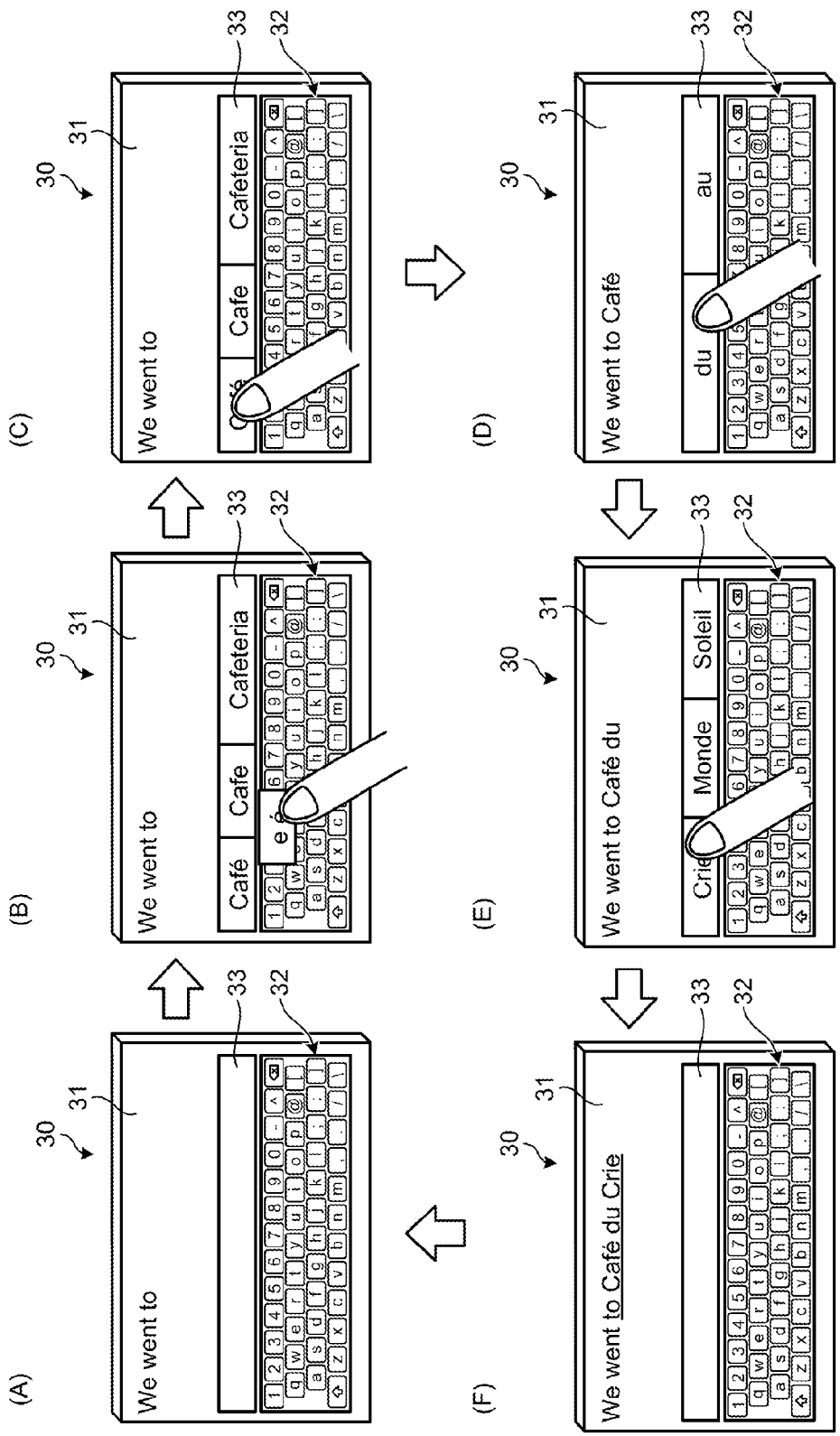
FIG. 6 is an explanatory diagram that illustrates an exemplary operation transition of an operation screen in relation to a first character-string candidate display process.

FIG. 5 is an explanatory diagram that illustrates operation types and exemplary character string candidates in relation to the mobile terminal 1. FIG. 6 is an explanatory diagram that illustrates an exemplary operation transition of an operation screen in relation to the first character-string candidate display process. The operation screen 30 in FIG. 6 (A) is in a state where the English character string "We went to" is input to the character display area 31 in the English mode. In the English mode, an English character string candidate is screen-displayed by using the English candidate dictionary 21.

In FIG. 5(A), if the processor 10 detects a key input of "C" on the operation display area 32, the processor 10 screen-displays the English character string candidates "Chance Card Control" on the conversion-candidate display area 33 by using the English candidate dictionary 21.

In FIG. 5(B), if the processor 10 then detects a key input of "a" on the operation display area 32, the processor 10 screen-displays the English character string candidates "Card Cafe Cake" on the conversion-candidate display area 33 by using the English candidate dictionary 21.

In FIG. 5(C), if the processor 10 then detects a key input of "f" on the operation display area 32, the processor 10 screen-displays the English character string candidates "Cafe Cafeteria" on the conversion-candidate display area 33 by using the English candidate dictionary 21.

In FIG. 6(B), where a French word is to be input temporarily, if the processor 10 detects a key operation of "e" on the operation display area 32, the processor 10 displays "e é" above the keys of the operation display area 32. Furthermore, if the processor 10 detects a key input of "é" on the operation display area 32, as illustrated in FIGS. 5(D) and 6(B), the English candidate dictionary 21 is changed to the English/French mixed candidate dictionary 23 because "é" is a French special character. The processor 10 uses the English/French mixed candidate dictionary 23 so as to screen-display English and French character string candidates "Café Cafe Cafeteria" on the conversion-candidate display area 33.

Next, if the processor 10 detects an operation to select the character string candidate "Café" on the conversion-candidate display area 33, as illustrated in FIGS. 5(E) and 6(C), the processor 10 screen-displays "We went to Café" on the character display area 31, as illustrated in FIG. 6(D). Furthermore, as the processor 10 has detected an operation to select the French character string candidate "Café", the English/French mixed candidate dictionary 23 is changed to the French candidate dictionary 22. The processor 10 uses the French candidate dictionary 22 so as to screen-display the French character string candidates "du au" on the conversion-candidate display area 33.

Moreover, if the processor 10 detects an operation to select the character string candidate "du" on the conversion-candidate display area 33, as illustrated in FIGS. 5(F) and 6(D), the processor 10 screen-displays "We went to Cafédu" on the character display area 31, as illustrated in FIG. 6(E). Furthermore, the processor 10 uses the French candidate dictionary 22 so as to screen-display the French character string candidates "Crie monde Soleil" on the conversion-candidate display area 33, as illustrated in FIG. 6(E).

As illustrated in FIGS. 5(G) and 6(E), if the processor 10 detects an operation to select the character string candidate "Crie" on the conversion-candidate display area 33, the processor 10 screen-displays "We went to Cafédu Crie" on the character display area 31, as illustrated in FIG. 6(F). Furthermore, if the processor 10 detects a key input of "w" on the operation display area 32, the French candidate dictionary 22 is changed to the English candidate dictionary 21, as "w" is not a French special character. The processor 10 uses the English candidate dictionary 21 so as to screen-display the English character string candidates "With White Win" on the conversion-candidate display area 33, as illustrated in FIG. 5(H).

Figure 7:
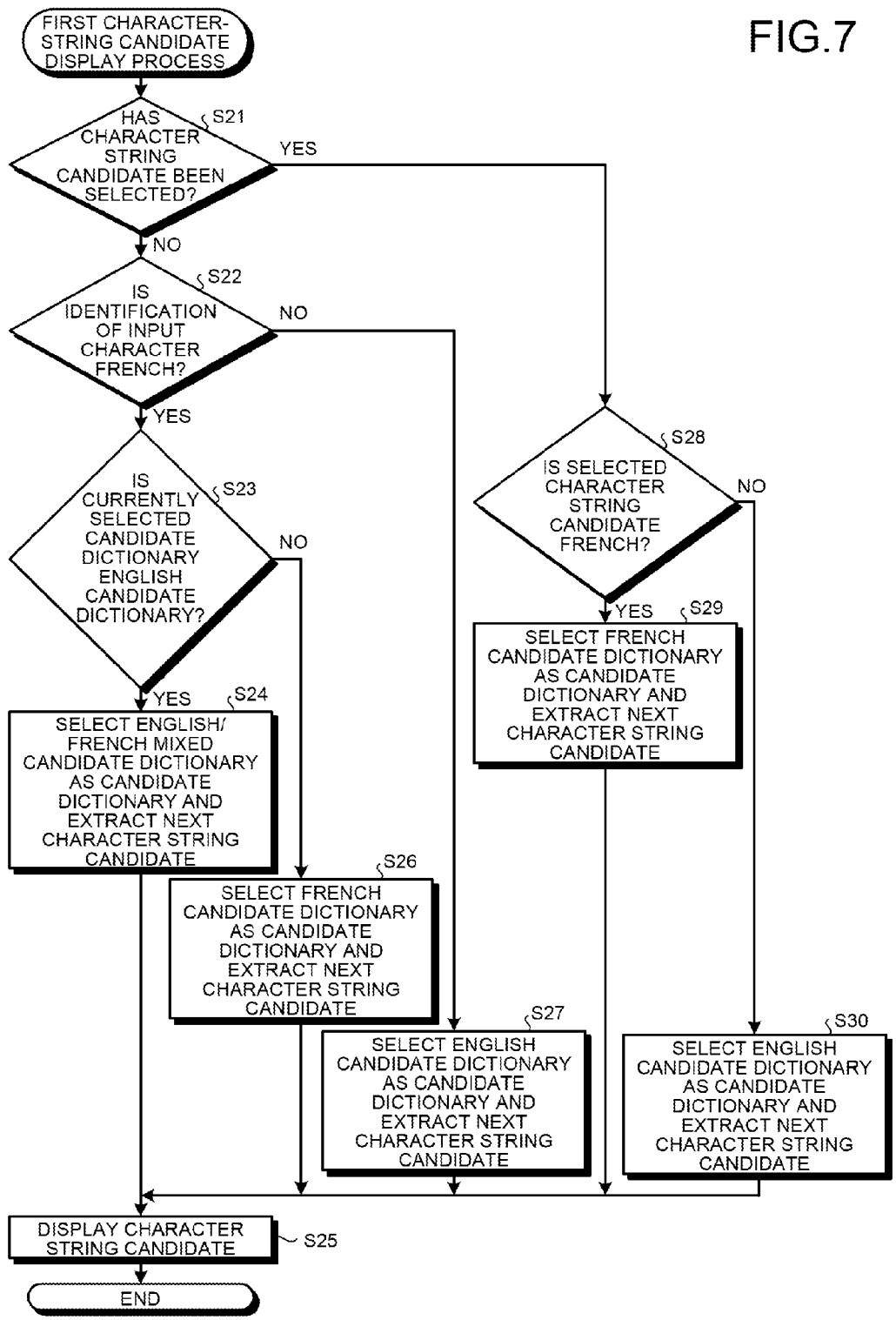
FIG. 7 is a flowchart that illustrates an exemplary operation of the processor in relation to the first character-string candidate display process of the mobile terminal.

FIG. 7 is a flowchart that illustrates an exemplary operation of the processor 10 in relation to the first character-string candidate display process of the mobile terminal 1. The first character-string candidate display process illustrated in FIG. 7 is a process to, in response to an operation to select a character string candidate or a key input of an input character, select a candidate dictionary that corresponds to the language of the character string candidate or the input character and to screen-display the next character string candidate on the conversion-candidate display area 33 by using the selected candidate dictionary.

As illustrated in FIG. 7, the processor 10 determines whether an operation to select a character string candidate on the conversion-candidate display area 33 has been detected (Step S21). If an operation to select a character string candidate has not been detected (No at Step S21), the processor 10 determines whether the identification of the input character is "French" (Step S22). If the identification of the input character is "French" (Yes at Step S22), the processor 10 determines whether the currently selected candidate dictionary is the English candidate dictionary 21 (Step S23).

If the currently selected candidate dictionary is the English candidate dictionary 21 (Yes at Step S23), the processor 10 selects the English/French mixed candidate dictionary 23 as a candidate dictionary and extracts the next character string candidate by using the English/French mixed candidate dictionary 23 (Step S24). The processor 10 then screen-displays the extracted character string candidate on the conversion-candidate display area 33 (Step S25) and terminates the operation illustrated in FIG. 7.

If the currently selected candidate dictionary is not the English candidate dictionary 21 (No at Step S23), e.g., if it is the English/French mixed candidate dictionary 23 or the French candidate dictionary 22, the processor 10 selects the French candidate dictionary 22 as a candidate dictionary (Step S26). The processor 10 extracts the next character string candidate by using the selected French candidate dictionary 22. The processor 10 then proceeds to Step S25 to screen-display the next character string candidate that has been extracted on the conversion-candidate display area 33.

If the identification of the input character is not "French" (No at Step S22), the processor 10 determines that the identification of the input character is "English" and selects the English candidate dictionary 21 so as to extract the next character string candidate by using the English candidate dictionary 21 (Step S27). The processor 10 then proceeds to Step S25 to screen-display the extracted character string candidate on the conversion-candidate display area 33.

If the processor 10 detects an operation to select a character string candidate (Yes at Step S21), the processor 10 determines whether the selected character string candidate is French (Step S28). If the selected character string candidate is French (Yes at Step S28), the processor 10 selects the French candidate dictionary 22 and extracts the next character string candidate by using the French candidate dictionary 22 (Step S29). The processor 10 then proceeds to Step S25 to screen-display the next character string candidate that has been extracted on the conversion-candidate display area 33.

If the selected character string candidate is not French (No at Step S28), the processor 10 selects the English candidate dictionary 21 and extracts the next character string candidate by using the English candidate dictionary 21 (Step S30). The processor 10 then proceeds to Step S25 to screen-display the next character string candidate that has been extracted on the conversion-candidate display area 33.

In the first character-string candidate display process illustrated in FIG. 7, if the identification of an input character is "French" and if the currently selected candidate dictionary is the English candidate dictionary 21, the processor 10 selects the English/French mixed candidate dictionary 23 and displays the next character string candidate by using the English/French mixed candidate dictionary 23. Accordingly, if, for example, a French special character is input when in the English mode, it is possible to input a French character as well as an English character without the need to perform an operation to switch to the French mode.

If the identification of an input character is "French" and if the currently selected candidate dictionary is not the English candidate dictionary 21, the processor 10 selects the French candidate dictionary 22 and displays the next character string candidate by using the French candidate dictionary 22. Accordingly, if a French special character is input by using the English/French mixed candidate dictionary 23 or the French candidate dictionary 22, a mode is switched to the French mode where the French candidate dictionary 22 is used; therefore, it is possible to input a French character without the need to perform an operation to switch to the French mode.

If the identification of an input character is not "French", the processor 10 selects the English candidate dictionary 21 and displays the next character string candidate by using the English candidate dictionary 21. Accordingly, if a character other than a French character, e.g., an English character is input, the English mode that uses the English candidate dictionary 21 is reset without the need to perform an operation to switch from the French mode to the English mode. Thus, the user workload can be reduced.

If the selected character string candidate is "French", the processor 10 selects the French candidate dictionary 22 and displays the next character string candidate by using the French candidate dictionary 22. Accordingly, if a French character string candidate is selected, the French mode that uses the French candidate dictionary 22 is selected; thus, the user workload for switching from the English mode to the French mode can be reduced.

If the selected character string candidate is not "French", the processor 10 selects the English candidate dictionary 21 and displays the next character string candidate by using the English candidate dictionary 21. Accordingly, if a character other than French, e.g., an English character string candidate is selected, the English mode that uses the English candidate dictionary 21 is selected; thus, the user workload for switching form the French mode to the English mode can be reduced.

Figure 8:
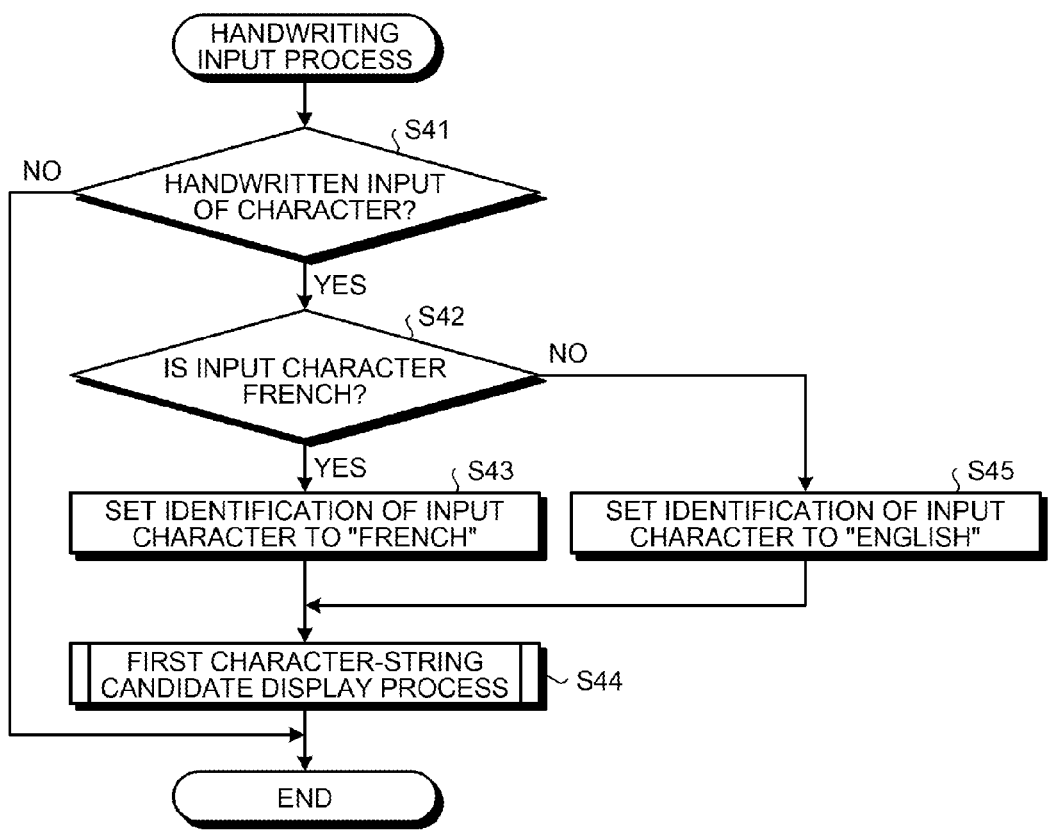
FIG. 8 is a flowchart that illustrates an exemplary operation of the processor in relation to a handwriting input process of the mobile terminal.

FIG. 8 is a flowchart that illustrates an exemplary operation of the processor 10 in relation to a handwriting input process of the mobile terminal 1. The handwriting input process illustrated in FIG. 8 is a process to identify a handwritten input character as English or French. In FIG. 8, the processor 10 determines whether a handwritten input of a character on an undepicted handwriting input screen has been detected (Step S41). If a handwritten input of a character has been detected (Yes at Step S41), the processor 10 determines whether the input character is "French" (Step S42). If the input character is "French" (Yes at Step S42), the processor 10 sets the identification of the input character to "French" (Step S43), performs the first character-string candidate display process illustrated in FIG. 7 (Step S44), and terminates the operation illustrated in FIG. 8.

If a handwritten input of a character has not been detected (No at Step S41), the processor 10 terminates the operation illustrated in FIG. 8. If the identification of the input character is not "French" (No at Step S42), the processor 10 sets the identification of the input character to "English" (Step S45) and proceeds to Step S44 to perform the first character-string candidate display process.

In the handwriting input process illustrated in FIG. 8, if a handwritten input character is "French", the processor 10 can set the identification of the input character to "French". If a handwritten input character is "English", the processor 10 can set the identification of the input character to "English". As a result, it is possible to automatically identify a handwritten input character.

Figure 9:
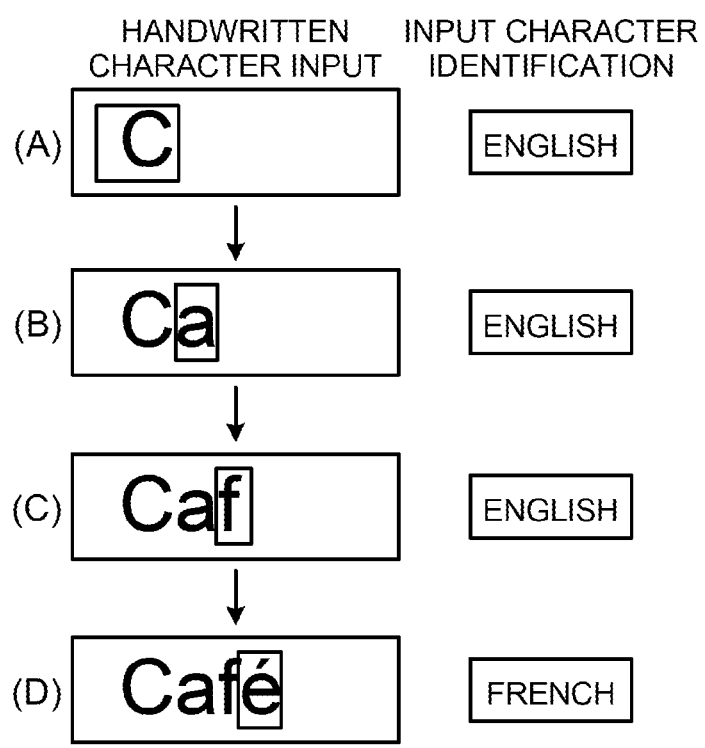
FIG. 9 is an explanatory diagram that illustrates an exemplary operation in relation to the handwriting input process.

FIG. 9 is an explanatory diagram that illustrates an exemplary operation in relation to the handwriting input process. As illustrated in FIG. 9(A), if a handwritten input is "C", the processor 10 sets the identification of the input character to "English". Furthermore, as illustrated in FIG. 9(B), if a handwritten input is "a", the processor 10 sets the identification of the input character to "English". Moreover, as illustrated in FIG. 9(C), if a handwritten input is "f", the processor 10 sets the identification of the input character to "English". Further, as illustrated in FIG. 9(D), if a handwritten input is "é", the processor 10 sets the identification of the input character to "French".

If a French character string candidate is selected when in the English mode that uses the English candidate dictionary 21, the processor 10 according to the first embodiment switches the English candidate dictionary 21 to the French candidate dictionary 22. As a result, the user workload for switching from the English mode to the French mode can be reduced.

If an English character string candidate is selected when in the mode that uses the French candidate dictionary 22 or the English/French mixed candidate dictionary 23, the processor 10 selects the English candidate dictionary 21. As a result, the user workload for switching to the English mode can be reduced.

If an input character is French and if the currently selected candidate dictionary is the English candidate dictionary 21, the processor 10 switches from the English candidate dictionary 21 to the English/French mixed candidate dictionary 23. Accordingly, if a French special character is input when in the English mode, a French character as well as an English character can be input by using the English/French mixed candidate dictionary 23. Moreover, the user workload can be reduced.

If an input character is French and if the currently selected candidate dictionary is not the English candidate dictionary 21, e.g., if it is the English/French mixed candidate dictionary 23 or the French candidate dictionary 22, the processor 10 selects the French candidate dictionary 22. Accordingly, if a French special character is input, a French character string candidate can be input by using the French candidate dictionary 22. Moreover, the user workload can be reduced.

If an input character is not French, the processor 10 selects the English candidate dictionary 21 and selects the English mode that uses the selected English candidate dictionary 21. Accordingly, if, for example, an English character is input, the English mode that uses the English candidate dictionary 21 can be easily reset. Moreover, the user workload can be reduced.

In the mobile terminal 1 according to the first embodiment, the English mode that uses the English candidate dictionary 21 and the French mode that uses the French candidate dictionary 22 are illustrated as an example, and the English mode is set as the normal mode that is usually used. However, the French mode may be set as the normal mode. In this case, if an input of a French character or a selection of a French character string candidate is detected while the English candidate dictionary 21 or the English/French mixed candidate dictionary 23 is used, the French mode that uses the French candidate dictionary 22 is reset.

The first embodiment illustrates English and French as an example; however, the embodiment is not limited to English or French and may be applied to various languages, e.g., Japanese, German, or Italian.

In the first embodiment, a candidate dictionary is switched between two languages, i.e., English and French; however, a candidate dictionary is not limited to two languages and may be switched among multiple languages, e.g., three languages of Japanese, English, and French.

The first embodiment illustrates two languages, i.e., English and French as an example; however, a candidate dictionary may be switched between two formats, i.e., a two-byte character and a one-byte katakana character. An embodiment in this case will be explained below as a second embodiment.

[b] Second Embodiment

Although not illustrated, a dictionary table of the mobile terminal 1 includes a one-byte katakana character candidate dictionary that stores therein one-byte katakana characters and character string candidates; a two-byte character candidate dictionary that stores therein two-byte characters and character string candidates; and a one-byte katakana character/two-byte character mixed candidate dictionary that stores therein one-byte katakana and two-byte character strings and character string candidates.

Figure 10:
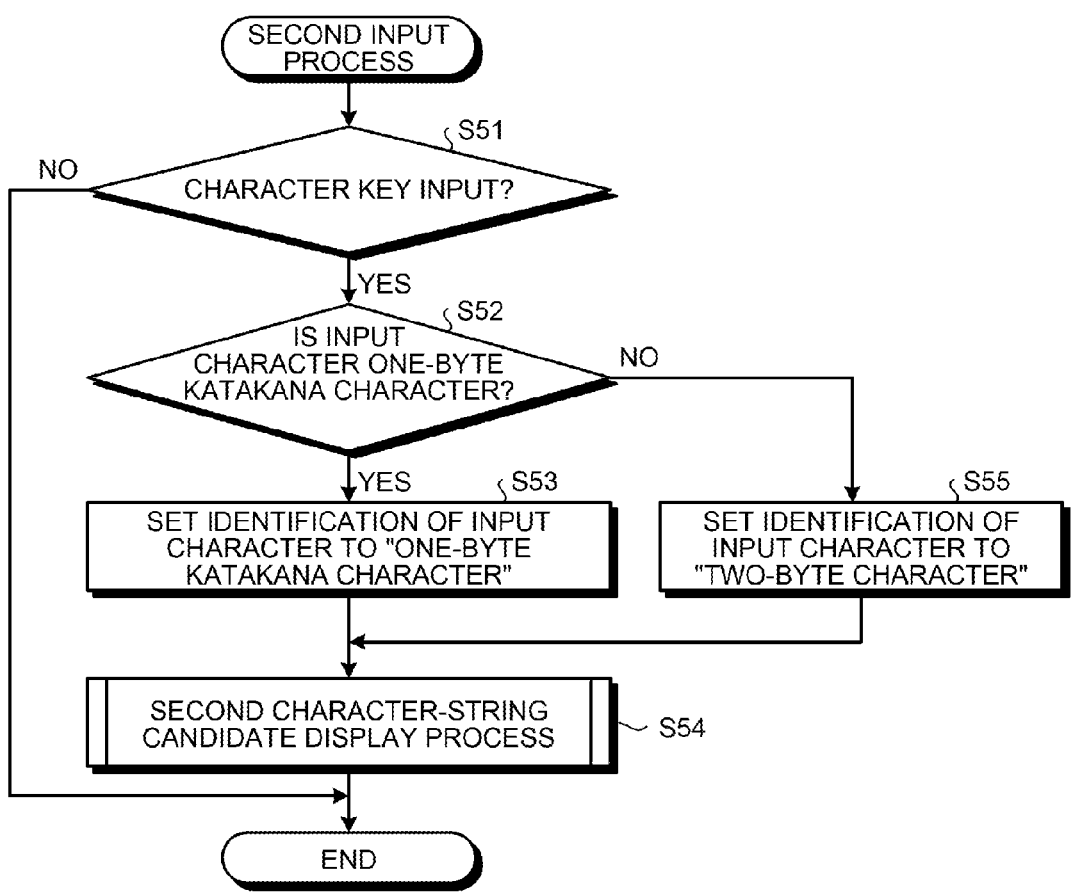
FIG. 10 is a flowchart that illustrates an exemplary operation of the processor in relation to a second input process of a mobile terminal according to a second embodiment.

FIG. 10 is a flowchart that illustrates an exemplary operation of the processor 10 in relation to a second input process of the mobile terminal 1 according to the second embodiment. The second input process illustrated in FIG. 10 is a process to detect a character key input on the operation display area 32.

As illustrated in FIG. 10, the processor 10 determines whether a character key input is on the operation display area 32 (Step S51). The processor 10 detects a character key input on the operation display area 32 via the touch input unit 7.

In the case of a key input (Yes at Step S51), the processor 10 determines whether the input character is a one-byte katakana character (Step S52). If the input character is a one-byte katakana character (Yes at Step S52), the processor 10 sets the identification of the input character to "one-byte katakana character" (Step S53), performs the second character-string candidate display process (Step S54), and then terminates the operation illustrated in FIG. 10.

If the input character is not a one-byte katakana character (No at Step S52), the processor 10 sets the identification of the input character to "two-byte character" (Step S55) and proceeds to Step S54 to perform the second character-string candidate display process.

If not a character key input (No at Step S51), the processor 10 terminates the operation illustrated in FIG. 10.

In the second input process illustrated in FIG. 10, the processor 10 detects a character key input on the operation display area 32 and, if the input character is a one-byte katakana character, sets the identification of the input character to "one-byte katakana character". If the input character is a two-byte character, the processor 10 sets the identification of the input character to "two-byte character". Accordingly, it is possible to automatically identify an input character.

Figure 11:
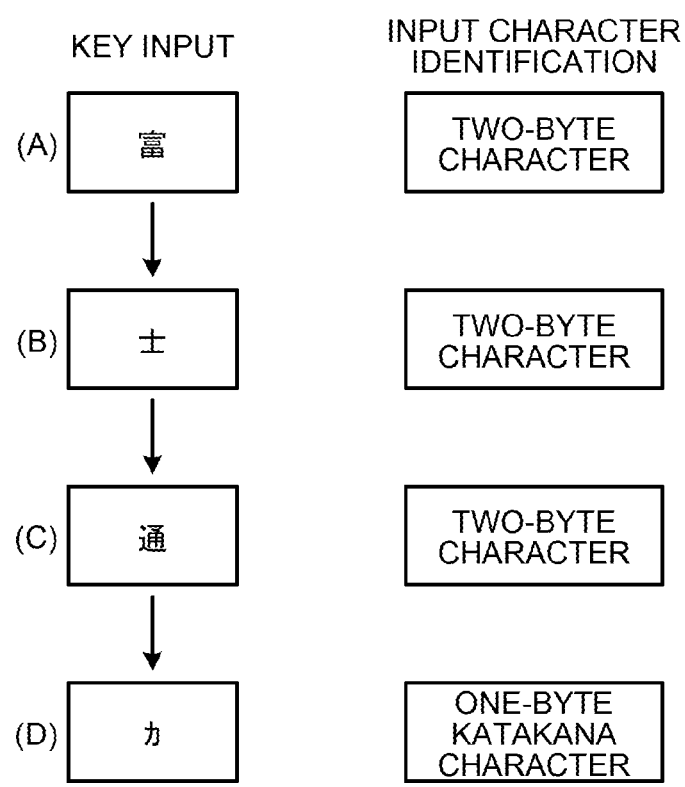
FIG. 11 is an explanatory diagram that illustrates an exemplary operation for two-byte characters and one-byte katakana characters in the mobile terminal.

FIG. 11 is an explanatory diagram that illustrates an exemplary operation for two-byte characters and one-byte katakana characters in the mobile terminal 1. As illustrated in FIG. 11(A), if a key input is "言", the processor 10 sets the identification of the input character to "two-byte character". Furthermore, as illustrated in FIG. 11(B), if a key input is "＋", the processor 10 sets the identification of the input character to "two-byte character". Moreover, as illustrated in FIG. 11(C), if a key input is "通", the processor 10 sets the identification of the input character to "two-byte character". Further, as illustrated in FIG. 11(D), if a key input is "カ", the processor 10 sets the identification of the input character to "one-byte katakana character".

Figure 12:
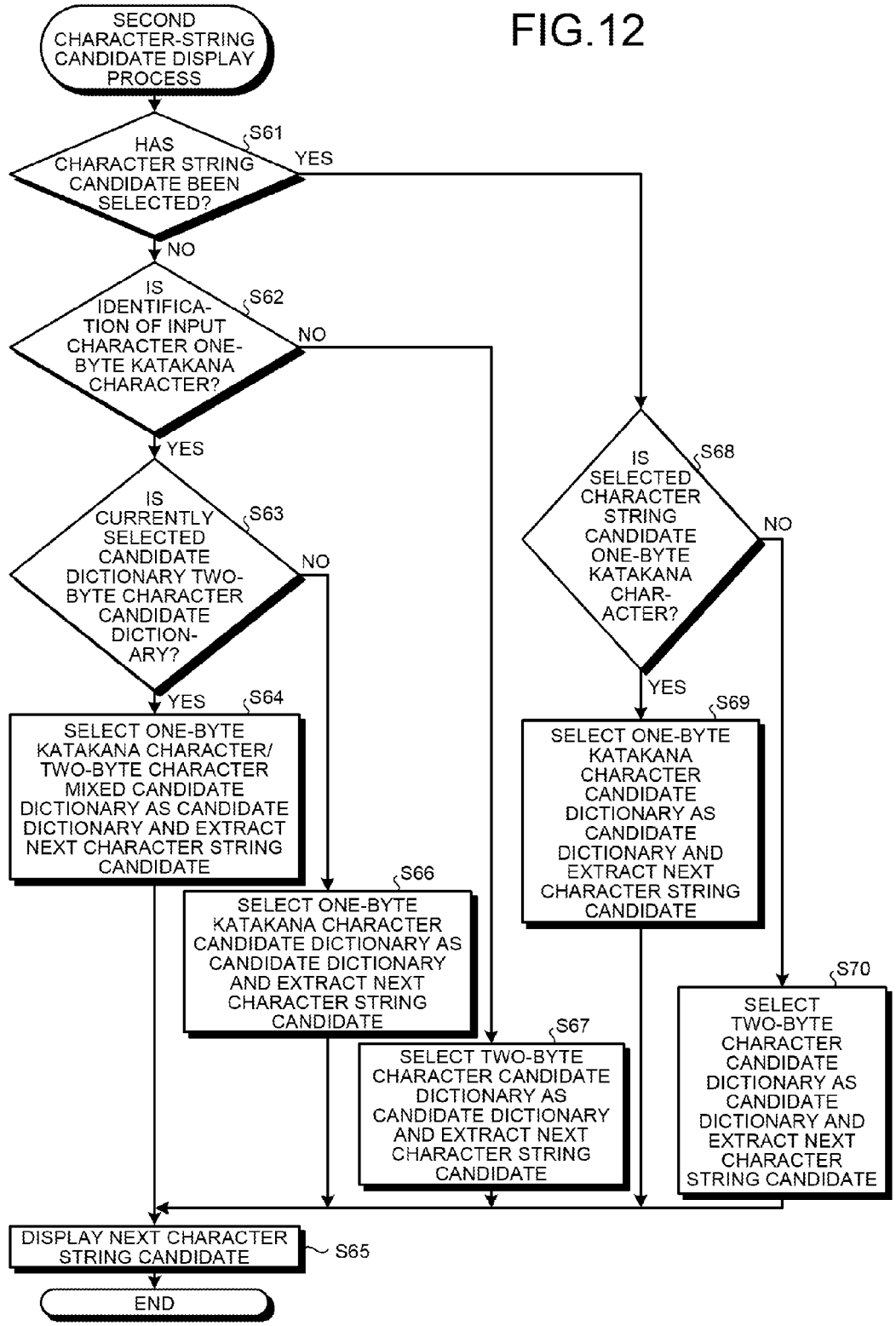
FIG. 12 is a flowchart that illustrates an exemplary operation of the processor in relation to a second character-string candidate display process of the mobile terminal.

FIG. 12 is a flowchart that illustrates an exemplary operation of the processor 10 in relation to the second character-string candidate display process of the mobile terminal 1. The second character-string candidate display process illustrated in FIG. 12 is a process to, in response to an operation to select a character string candidate or a key input of an input character, select a candidate dictionary that corresponds to a one-byte katakana character or two-byte character of the character string candidate or the input character and to screen-display the next character string candidate on the conversion-candidate display area 33 by using the candidate dictionary.

As illustrated in FIG. 12, the processor 10 determines whether an operation to select a character string candidate on the conversion-candidate display area 33 has been detected (Step S61). If an operation to select a character string candidate has not been detected (No at Step S61), the processor 10 determines whether the identification of the input character is "one-byte katakana character" (Step S62). If the identification of the input character is "one-byte katakana character" (Yes at Step S62), the processor 10 determines whether the currently selected candidate dictionary is the two-byte character candidate dictionary (Step S63).

If the currently selected candidate dictionary is the two-byte character candidate dictionary (Yes at Step S63), the processor 10 selects the one-byte katakana character/two-byte character mixed candidate dictionary as a candidate dictionary and extracts the next character string candidate by using the one-byte katakana character/two-byte character mixed candidate dictionary (Step S64). The processor 10 then screen-displays the extracted character string candidate on the conversion-candidate display area 33 (Step S65) and terminates the operation illustrated in FIG. 12.

If the currently selected candidate dictionary is not the two-byte character candidate dictionary (No at Step S63), i.e., if it is the one-byte katakana character/two-byte character mixed candidate dictionary or the one-byte katakana character candidate dictionary, the processor 10 selects the one-byte katakana character candidate dictionary as a candidate dictionary (Step S66). The processor 10 extracts the next character string candidate by using the selected one-byte katakana character candidate dictionary. The processor 10 then proceeds to Step S65 to screen-display the next character string candidate that has been extracted on the conversion-candidate display area 33.

If the identification of the input character is not "one-byte katakana character" (No at Step S62), the processor 10 determines that the identification of the input character is "two-byte character", selects the two-byte character candidate dictionary as a candidate dictionary, and extracts the next character string candidate by using the two-byte character candidate dictionary (Step S67). The processor 10 then proceeds to Step S65 to screen-display the extracted character string candidate on the conversion-candidate display area 33.

If an operation to select a character string candidate has been detected (Yes at Step S61), the processor 10 determines whether the selected character string candidate is a one-byte katakana character (Step S68). If the selected character string candidate is a one-byte katakana character (Yes at Step S68), the processor 10 selects the one-byte katakana character candidate dictionary as a candidate dictionary and extracts the next character string candidate by using the one-byte katakana character candidate dictionary (Step S69). The processor 10 then proceeds to Step S65 to screen-display the next character string candidate that has been extracted on the conversion-candidate display area 33.

If the selected character string candidate is not a one-byte katakana character (No at Step S68), the processor 10 selects the two-byte character candidate dictionary as a candidate dictionary and extracts the next character string candidate by using the two-byte character candidate dictionary (Step S70). The processor 10 then proceeds to Step S65 to screen-display the next character string candidate that has been extracted on the conversion-candidate display area 33.

In the second character-string candidate display process illustrated in FIG. 12, if the identification of an input character is "one-byte katakana character" and if the currently selected candidate dictionary is the two-byte character candidate dictionary, the processor 10 selects the one-byte katakana character/two-byte character mixed candidate dictionary and displays the next character string candidate by using the one-byte katakana character/two-byte character mixed candidate dictionary. Accordingly, if, for example, a one-byte katakana character is input when in the two-byte character mode, it is possible to input a one-byte katakana character as well as a two-byte character without the need to perform an operation to switch to the one-byte katakana character mode.

If the identification of an input character is "one-byte katakana character" and if the currently selected candidate dictionary is not the two-byte character candidate dictionary, the processor 10 selects the one-byte katakana character candidate dictionary and displays the next character string candidate by using the one-byte katakana character candidate dictionary. Accordingly, if a one-byte katakana character is input by using the one-byte katakana character/two-byte character mixed candidate dictionary or the one-byte katakana character candidate dictionary, the one-byte katakana character mode that uses the one-byte katakana character candidate dictionary is selected; therefore, it is possible to input a one-byte katakana character without the need to perform an operation to switch to the one-byte katakana character mode.

If the identification of an input character is not "one-byte katakana character", the processor 10 selects the two-byte character candidate dictionary and displays the next character string candidate by using the two-byte character candidate dictionary. Accordingly, if a character other than a one-byte katakana character, e.g., a two-byte character is input, the two-byte character mode that uses the two-byte character candidate dictionary is reset without the need to perform an operation to switch from the one-byte katakana character mode to the two-byte character mode. Therefore, it is possible to reduce the user workload.

If the selected character string candidate is "one-byte katakana character", the processor 10 selects the one-byte katakana character candidate dictionary and displays the next character string candidate by using the one-byte katakana character candidate dictionary. Accordingly, if a "one-byte katakana" character string candidate is selected, the one-byte katakana character mode that uses the one-byte katakana character candidate dictionary is selected; therefore, it is possible to reduce the user workload for switching from the two-byte character mode to the one-byte katakana character mode.

If the selected character string candidate is not "one-byte katakana character", the processor 10 selects the two-byte character candidate dictionary and displays the next character string candidate by using the two-byte character candidate dictionary. Accordingly, if a character other than a one-byte katakana character, e.g., a two-byte character string candidate is selected, the two-byte character mode that uses the two-byte character candidate dictionary is selected; therefore, it is possible to reduce the user workload for switching from the one-byte katakana character mode to the two-byte character mode.

If a one-byte katakana character string candidate is selected when in the two-byte character mode that uses the two-byte character candidate dictionary, the processor 10 according to the second embodiment switches from the two-byte character candidate dictionary to the one-byte katakana character candidate dictionary. Accordingly, it is possible to reduce the user workload for switching from the two-byte character mode to the one-byte katakana character mode.

If a two-byte character string candidate is selected when in the mode that uses the one-byte katakana character candidate dictionary or the one-byte katakana character/two-byte character mixed candidate dictionary, the processor 10 selects the two-byte character candidate dictionary. Accordingly, it is possible to reduce the user workload for switching to the two-byte character mode.

If an input character is a one-byte katakana character and if the currently selected candidate dictionary is the two-byte character candidate dictionary, the processor 10 switches from the two-byte character candidate dictionary to the one-byte katakana character/two-byte character mixed candidate dictionary. Accordingly, if a one-byte katakana character is input when in the two-byte character mode, it is possible to input a one-byte katakana character as well as a two-byte character by using the one-byte katakana character/two-byte character mixed candidate dictionary. Furthermore, the user workload can be reduced.

If an input character is a one-byte katakana character and if the currently selected candidate dictionary is not the two-byte character candidate dictionary, e.g., if it is the one-byte katakana character/two-byte character mixed candidate dictionary or the one-byte katakana character candidate dictionary, the processor 10 selects the one-byte katakana character candidate dictionary. Accordingly, if a one-byte katakana character is input, a one-byte katakana character can be input by using the one-byte katakana character candidate dictionary.

If an input character is not a one-byte katakana character, the processor 10 selects the two-byte character candidate dictionary and selects the two-byte character mode that uses the selected two-byte character candidate dictionary. Accordingly, if, for example, a two-byte character is input, the two-byte character mode that uses the two-byte character candidate dictionary is easily reset. Furthermore, the user workload can be reduced.

Although the above embodiment illustrates different language characters or character formats, such as one-byte katakana characters or two-byte characters, this embodiment is not a limitation.

The above embodiment illustrates the mobile terminal 1, such as a tablet terminal; however, the embodiment may be applied to an information processing apparatus, such as a personal computer.

Components of each unit illustrated do not necessarily need to be physically configured as illustrated in the drawings. Specifically, specific forms of separation and combination of each unit are not limited to those depicted in the drawings. A configuration may be such that all or some of units are functionally or physically separated or combined in an arbitrary unit depending on various types of loads or usage.

All or any of various processing functions performed by each device may be implemented by a CPU (Central Processing Unit) (or a microcomputer such as an MPU (Micro Processing Unit), MCU (Micro Controller Unit), or the like). Furthermore, it is self-evident that all or any of the various processing functions may be implemented by programs analyzed and executed by a CPU (or a microcomputer such as an MPU or MCU) or by wired logic hardware.

Figure 13:
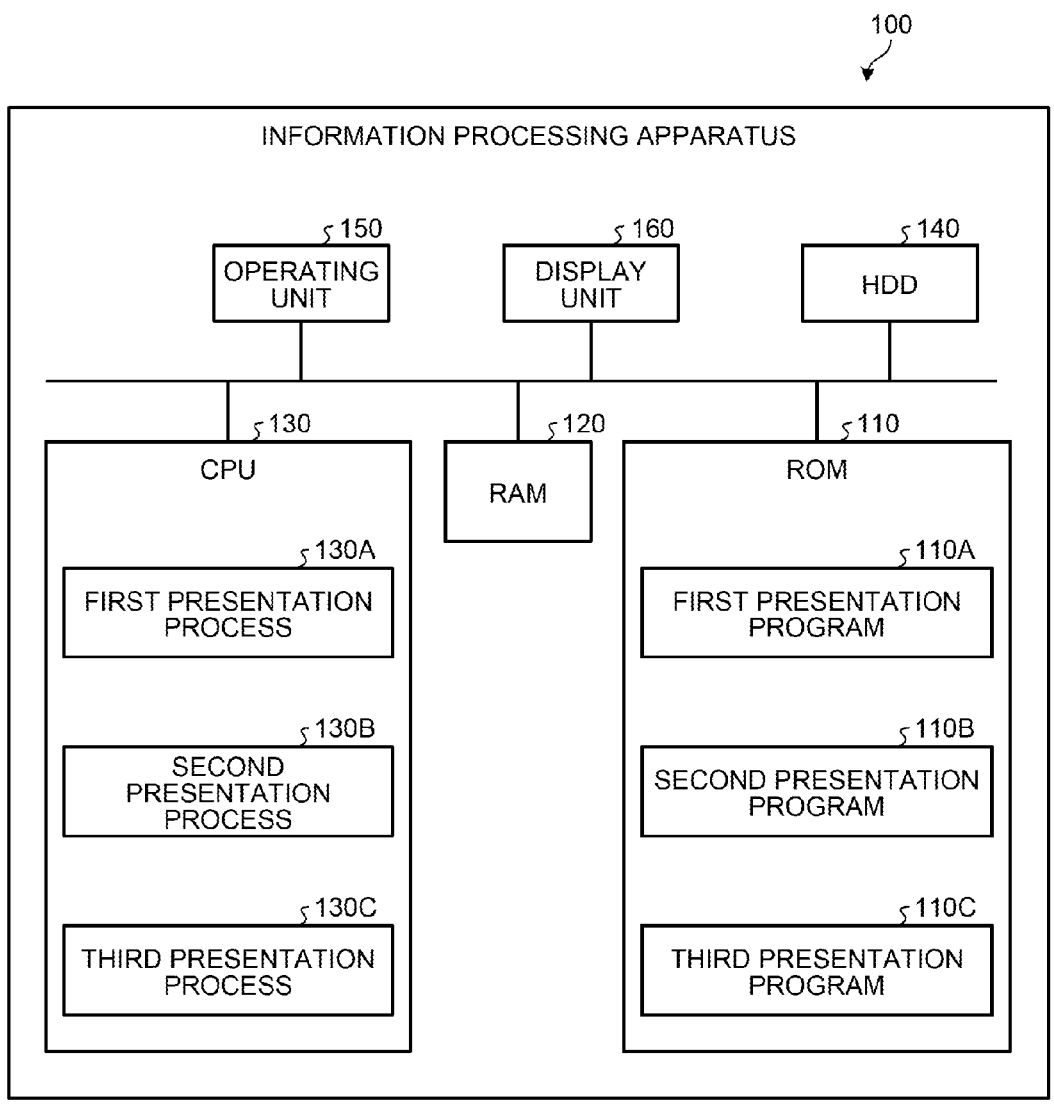
FIG. 13 is an explanatory diagram that illustrates an example of an information processing apparatus that performs a presentation program.

The various processes that have been described in the embodiment may be performed if prepared programs are performed by an information processing apparatus. In the following, an explanation is given of an example of an information processing apparatus that performs a program that has the same functionality as that in the above-described embodiment. FIG. 13 is an explanatory diagram that illustrates an information processing apparatus 100 that performs a presentation program.

An information processing apparatus 100 that executes a presentation program illustrated in FIG. 13 includes a ROM 110, a RAM 120, a CPU 130, an HDD 140, an operating unit 150, and a display unit 160.

The ROM 110 pre-stores therein a presentation program that executes the same functionality as that in the above-described embodiment. Instead of the ROM 110, a presentation program may be recorded on a recording medium readable by an undepicted drive. The recording medium may be, for example, a portable recording medium such as a CD-ROM, DVD disk, USB memory, or SD card, or a semiconductor memory such as a flash memory. As illustrated in FIG. 13, the presentation program includes a first presentation program 110A, a second presentation program 110B, and a third presentation program 110C. The first presentation program 110A, the second presentation program 110B, and the third presentation program 110C may be combined or separated as appropriate.

The CPU 130 reads the first presentation program 110A, the second presentation program 110B, and the third presentation program 110C from the ROM 110 and executes each read program. The CPU 130 performs the first presentation program 110A, the second presentation program 110B, and the third presentation program 110C as a first presentation process 130A, a second presentation process 130B, and a third presentation process 130C, respectively.

If, while a character string candidate in a first character format is presented, a character in a second character format, which is different from the first character format, is selected, the CPU 130 presents character string candidates in the first character format and the second character format on the display unit 160. Furthermore, if, while character string candidates in the first character format and the second character format are presented, a character in the second character format is selected, the CPU 130 presents a character string candidate in the second character format on the display unit 160. Moreover, if, while a character string candidate in the second character format is presented, a character in a character format other than the second character format is selected, the CPU 130 presents a character string candidate in the first character format on the display unit 160. As a result, it is possible to reduce the workload of temporarily changing a character format.

According to the disclosed embodiment, it is possible to reduce the workload of temporarily changing a character format.

All examples and conditional language recited herein are intended for pedagogical purposes of aiding the reader in understanding the invention and the concepts contributed by the inventors to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing apparatus comprising a processor, wherein the processor executes a process including:
   an input by key operation, where the input is in a first character format or a second character format, the second character format being different from the first character format;
   determining whether an input inputted by key operation is a special character or a special word of the second character format;
   while a character string candidate for the input in the first character format is presented and when, by determining that the input is the special character or the special word of the second character format, the input is in the second character format, presenting character string candidates in the first character format and the second character format;
   while character string candidates in the first character format and the second character format are presented and when, by determining that the input is the special character or the special word of the second character format, the input is in the second character format, presenting the character string candidate in the second character format; and
   while the character string candidate in the second character format is presented and when an input in a character format other than the second character format is inputted, presenting the character string candidate in the first character format.

2. A non-transitory computer-readable recording medium having stored therein a presentation program causing an information processing apparatus to execute a process comprising:
   an input by key operation, where the input is in a first character format or a second character format, the second character format being different from the first character format;
   determining whether an input inputted by key operation is a special character or a special word of the second character format;
   while a character string candidate for the input in the first character format is presented and when, by determining that the input is the special character or the special word of the second character format, the input is in the second character format, presenting character string candidates in the first character format and the second character format;
   while character string candidates in the first character format and the second character format are presented and when, by determining that the input is the special character or the special word of the second character format, the input is in the second character format, presenting the character string candidate in the second character format; and
   while the character string candidate in the second character format is presented and when an input in a character format other than the second character format is inputted, presenting the character string candidate in the first character format.

3. A presentation method for an information processing apparatus, the presentation method comprising:

an input by key operation, where the input is in a first character format or a second character format, the second character format being different from the first character format;

determining, by a processor, whether an input inputted by key operation is a special character or a special word of the second character format;

while a character string candidate for the input in the first character format is presented and when, by determining that the input is the special character or the special word of the second character format, the input is in the second character format, presenting, by the processor, character string candidates in the first character format and the second character format;

while character string candidates in the first character format and the second character format are presented and when, by determining that the input is the special character or the special word of the second character format, the input is in the second character format is inputted by key operation, presenting, by the processor, the character string candidate in the second character format; and while the character string candidate in the second character format is presented and when an input in a character format other than the second character format is inputted, presenting, by the processor, the character string candidate in the first character format.

* * * * *